Sept. 19, 1967 W. G. GRAINGER 3,341,927

APPARATUS FOR ASSEMBLING ARTICLES ON PROJECTING MEMBERS

Filed June 21, 1965 4 Sheets-Sheet 1

INVENTOR,
W. G. GRAINGER

BY R. P. Miller

ATTORNEY

Sept. 19, 1967 W. G. GRAINGER 3,341,927

APPARATUS FOR ASSEMBLING ARTICLES ON PROJECTING MEMBERS

Filed June 21, 1965 4 Sheets-Sheet 4

3,341,927

APPARATUS FOR ASSEMBLING ARTICLES ON PROJECTING MEMBERS

William G. Grainger, Winston-Salem, N.C., assignor to Western Electric Company, Incorporated, New York, N.Y., a corporation of New York Filed June 21, 1965, Ser. No. 465,433
7 Claims. (Cl. 29—203)

ABSTRACT OF THE DISCLOSURE

A disk is first punched from a strip and then assembled onto a rotating lead projecting from a component. Particularly, a chisel point is formed on the lead whereupon a punch having a vacuum passageway therethrough severs the disk from the strip and assembles the disk onto the lead. Vacuum holds the disk on the end of the punch as the punch descends over the rotating chisel point whereupon the lead is forced through the disk and into the passageway to restrict the passage of air through the passageway and assemble the disk onto the lead.

This invention relates to apparatus for assembling electrical components, and more particularly to apparatus for fabricating and assembling an insulating desk onto a wire lead extending from a capacitor anode.

In the manufacture of electrical components, such as solid electrolyte tantalum capacitors, an insulating disk is assembled onto a lead, such as a tantalum wire lead, projecting from a body, such as a sintered tantalum anode. This disk insulates the lead from a metal casing which is formed around the body in a subsequent operation. Previously, it was necessary to punch or drill a hole through the disk to form a washer, and then the washer was manually assembled onto the lead.

It is an object of this invention to provide new and improved apparatus for assembling electrical components.

Another object of the invention resides in an apparatus for moving one component through a vacuum-held second component to release and assemble the components.

A further object of the invention resides in sequentially forming a chisel point on a wire lead and then rotating the lead while forcing a penetrable disk against the chisel point to drill a hole through the disk and thus assemble the disk onto the lead.

An additional object of the invention is to force an apertured transfer member and a disk onto a wire lead thereby passing the lead through the disk and into the aperture for interrupting a vacuum applied through the aperture to hold the disk on the transfer member.

A still further object of the invention is the provision of an apparatus for severing a disk from a strip by an apertured punch and then forcing the severed disk and punch onto a wire lead thereby passing the lead through the disk and into the aperture to interrupt a vacuum applied through the aperture to hold the disk on the punch.

With these and other objects in view, the present invention contemplates assembling a vacuum held penetrable disk onto a rotating wire lead wherein the lead passes through the disk to interrupt the vacuum holding force. More particularly, a carrier supporting an electrical component advances to a first work station, whereupon facilities are actuated to form a chisel point on a wire lead extending from the component. The carrier then advances the component to a second work station where the component is rotated about its longitudinal axis. Upon the advance to the second work station, an apertured punch is moved to sever a disk from a penetrable strip of insulation and force the severed disk onto the rotating lead. A vacuum is applied to the aperture to hold the severed disk on the punch. As the punch moves, the rotating chisel point penetrates through the disk and into the aperture thereby interrupting the vacuum and releasing the disk.

Other objects and advantages of the present invention will be apparent from the following detailed description when considered in conjunction with the accompanying drawings, wherein.

Figure 1:
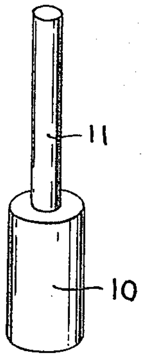
FIG. 1 shows a tantalum capacitor anode with a tantalum wire lead extending therefrom.
Figure 2:
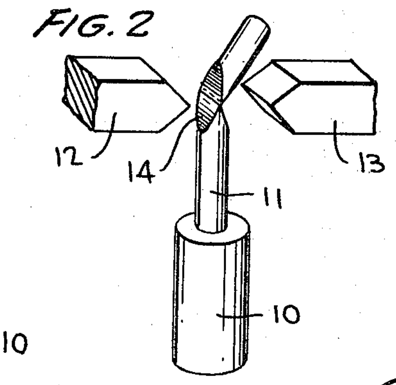
FIG. 2 shows two V-edged nipping dies forming a chisel point on the lead extending from the anode.
Figure 3:
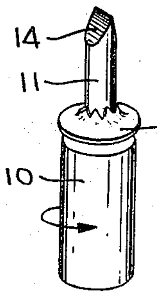
FIG. 3 shows an insulating disk being forced onto a rotating lead extending from the anode.

Referring first to FIG. 1, there is shown a cylindrical component body 10, such as a sinered tantalum anode with a wire lead 11, such as an imbedded tantalum wire lead, projecting outwardly from the body 10. As shown in FIG. 2, a pair of coacting V-edged dies 12 and 13 forms and severs the lead, thus forming a chisel point 14 on the end of an unsevered portion of the lead 11. In FIG. 3, a penetrable disk 17 of insulation, such as is sold under the trademark "Teflon," is forced onto a rotating chisel point 14 to drill the lead 11 through the disk 17 and thereby assembly the disk 17 onto the lead 11.

*General description*

Figure 4:
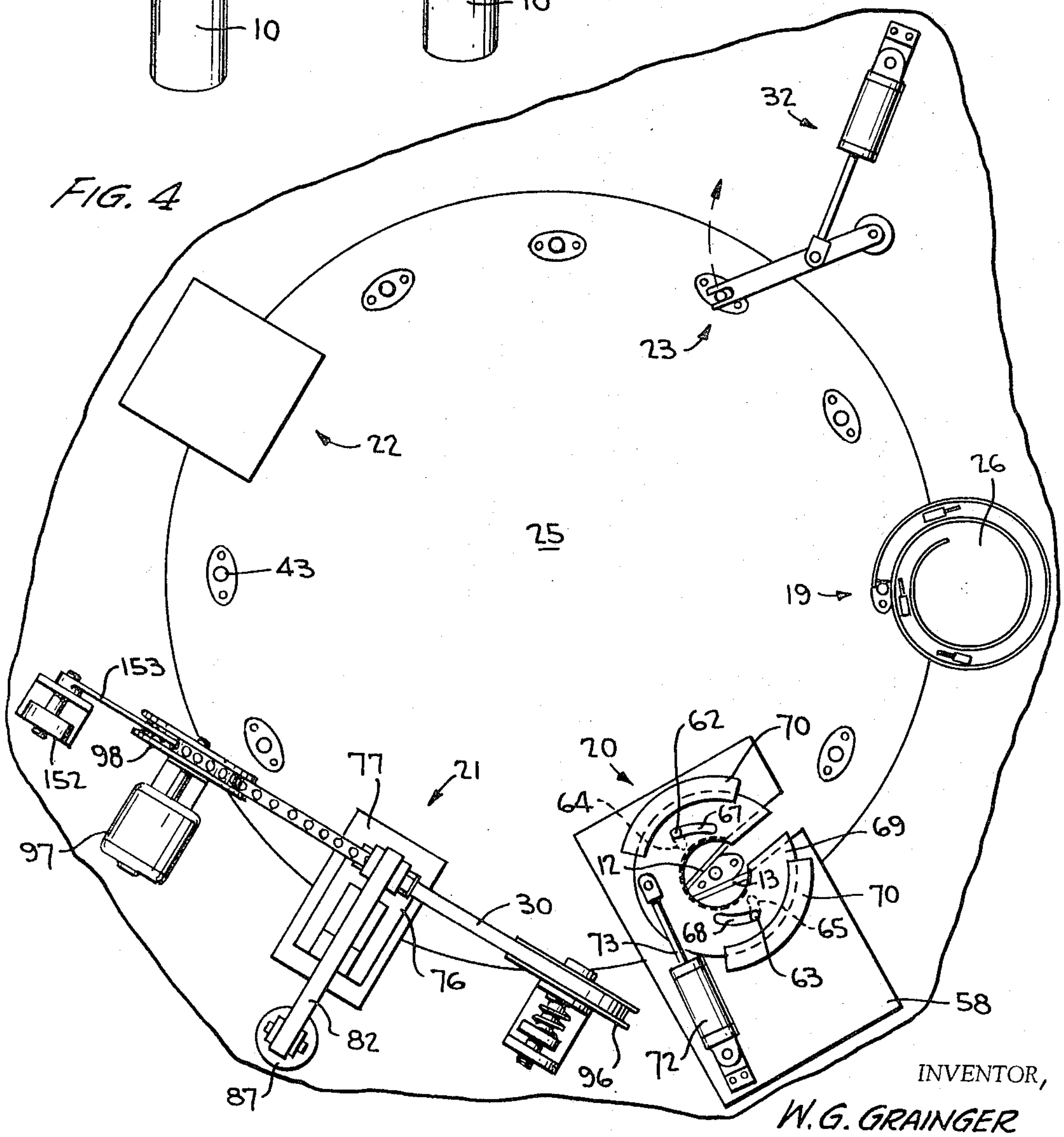
FIG. 4 is a plan view showing a machine embodying the principles of the invention and particularly illustrating a rotary conveyor for advancing individual anodes to various work stations.

Referring to FIG. 4 for a general description of the machine for assembling the disks 17 upon the leads 11 extending from the anodes 10, there are shown various work stations 19, 20, 21, 22, and 23 spaced around a rotary indexing conveyor 25. Specifically, the conveyor 25 advances individual anodes from a loading station 19 sequentially to a chisel point forming station 20, a disk punching and assembling station 21, a subsequent work station 22, and an unloading station 23.

First, the anodes 10 are successively fed into the conveyor at the loading station 19 by a commercial vibratory bowl feeder 26.

Next, the individual anodes 10 are indexed to the chisel point forming station 20 whereupon the individual leads 11 are sequentially positioned between the spaced forming and severing dies 12 and 13. Following positioning of each wire, V-edged dies 12 and 13 are moved to nip the lead 11 and form the chisel point 14.

Figure 7:
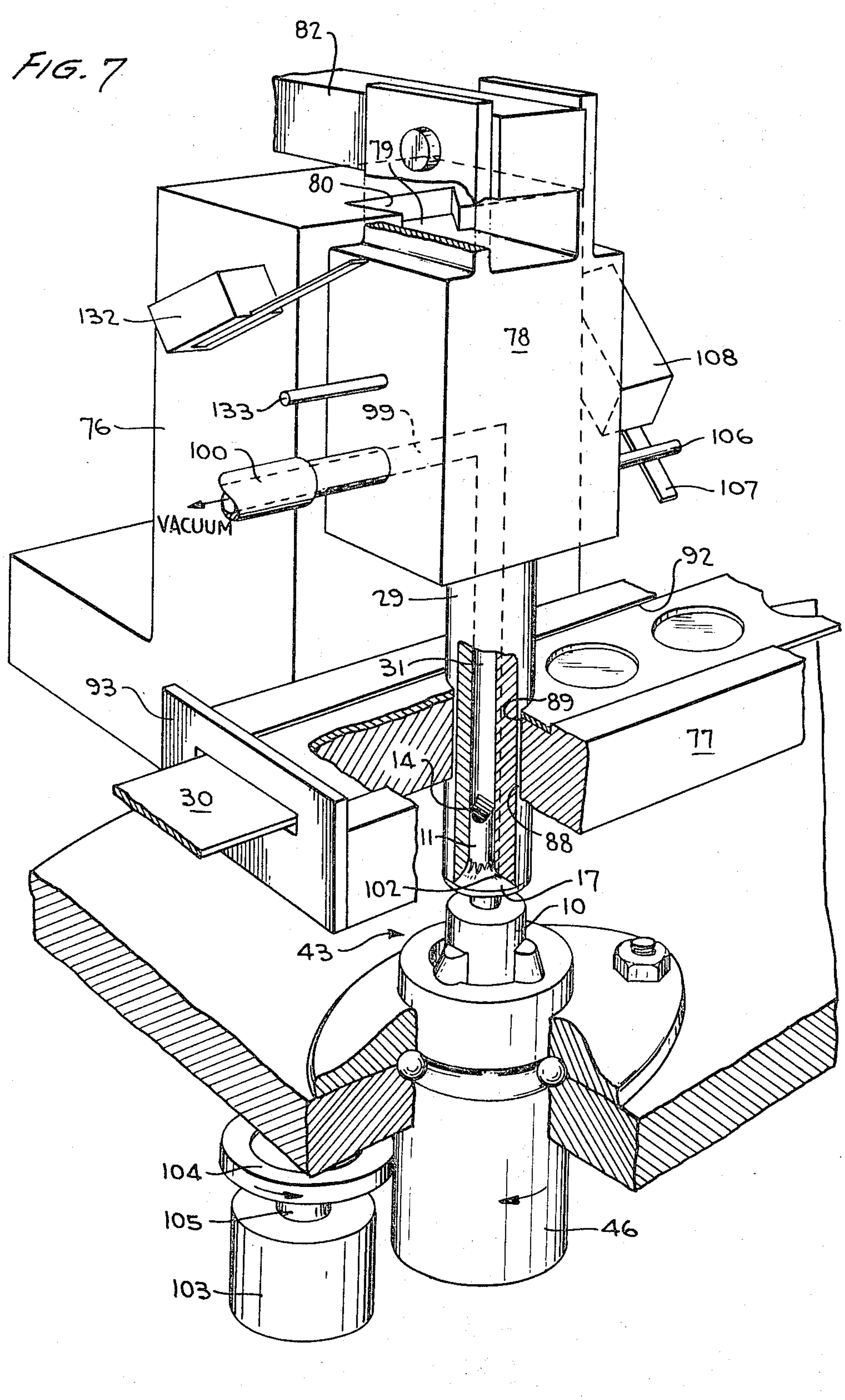
FIG. 7 is a front view of a disk punch mechanism of FIGS. 4 and 5 with cutout portions showing an apertured punch assembling a disk onto a wire lead.

Then, the anode 10 is indexed from the chisel point forming station 20 to the disk punching and assembling station 21. Upon completion of this indexing, a movable apertured punch 29, FIG. 7, is moved to sever a disk from a tape 30 and assemble the severed disk 17 onto the rotating lead 11 of the anode 10. A vacuum source (not shown) supplies a vacuum to a passageway or aperture 31 running to the end of the punch 29 to hold the severed disk 17 on the end of the punch 29 over the aperture 31.

As the punch 29 moves, the rotating chisel point 14 penetrates or drills through the advancing disk 17 and is received in the aperture 31 thereby interrupting the vacuum to release and assemble the disk 17 on the wire 11.

From the disk punching and assembling station 21 the conveyor 25 moves the anode 10 to the subsequent work station 22 where a mechanism, such as a welding device performs an operation upon the anode.

Finally, the anode is advanced to the unloading station 23 whereupon a suitable transfer arm mechanism 32 removes the anodes from the conveyor 25 and transfers them to a receptacle (not shown).

*Anode feeding and conveying*

Figure 5:
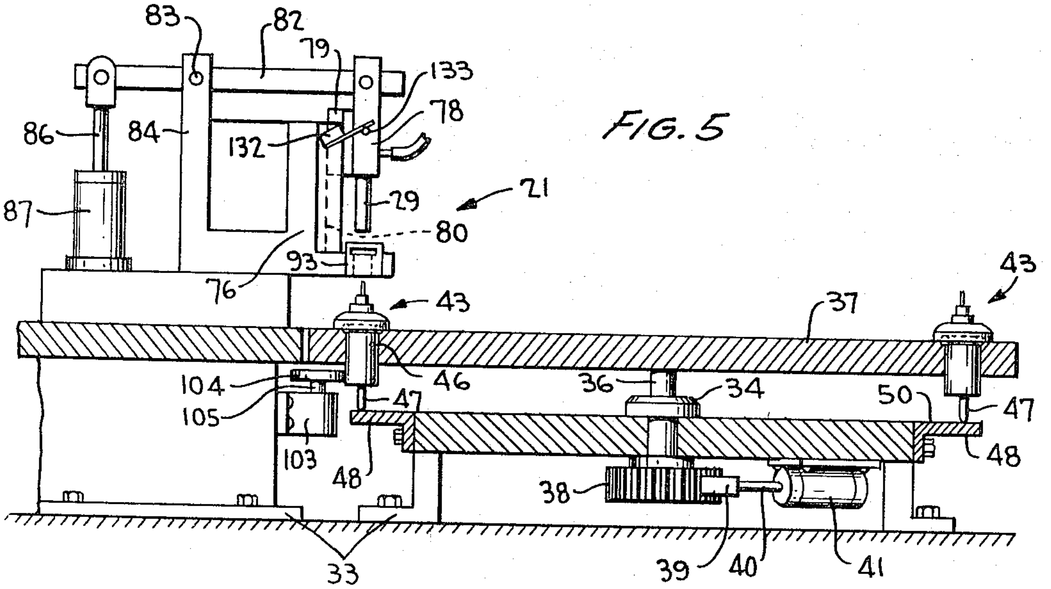
FIG. 5 is a side elevational view of a portion of the machine in FIG. 4 showing a partial cross section of the conveyor together with a disk punch mechanism.
Figure 6:
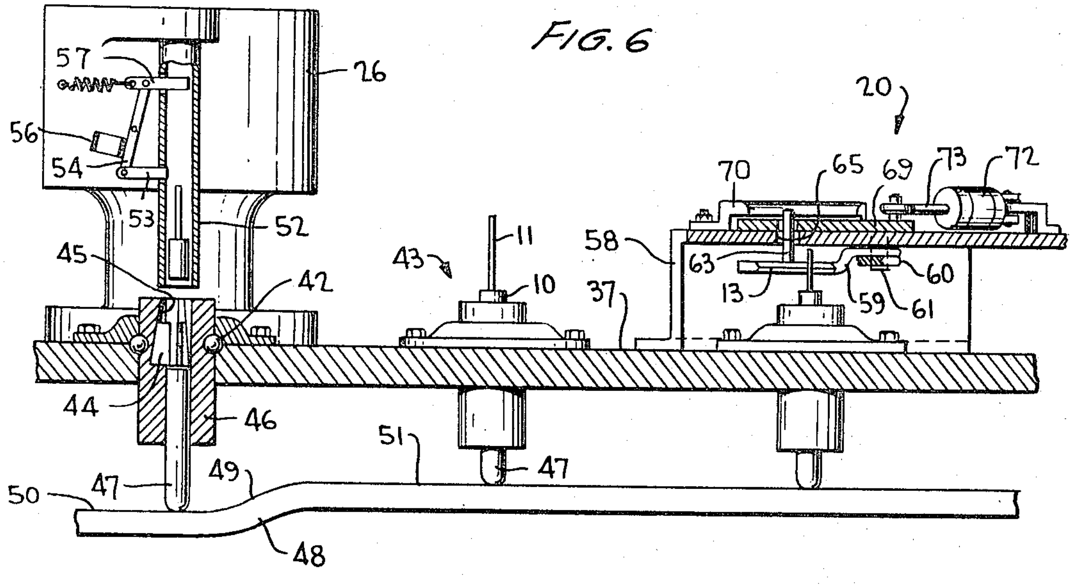
FIG. 6 is a side elevational view of another portion of the machine in FIG. 4 showing a partial cross section of a vibratory apparatus feeding an electrical component to a chuck on the conveyor and a chisel point forming mechanism.

Referring next to FIGS. 4, 5, and 6 wherein the details of the anode feeding and conveying mechanism are shown, a frame 33 rotatably supports a hub 34 mounted on a rotatable vertical shaft 36. The upper end of the shaft 36 supports and is attached to a round, horizontal conveyor table 37. Attached to the lower end of the shaft 36 is a ratchet wheel 38 which is engaged by a spring-biased pawl 39 on a piston rod 40. The piston rod 40 is slidably seated in an air cylinder 41 mounted on the frame 33. Upon actuation of the air cylinder 41, the pawl 39 rotates the ratchet wheel 38, shaft 36, and table 37 through a predetermined angle.

Spaced about the periphery of the conveyor table 37 are arrays of ball bearings 42 supporting a plurality of rotatable chucks 43. Each chuck 43 has a plurality of wedge jaws 44 which are slidable in vertical bores 45 formed in a sleeve-like housing 46. An actuator rod 47 is slidable in the housing 46 for abutting the ends of the wedge jaws 44 and is effective to slide the wedge jaws 44 in the bores 45. The inner surfaces of the bores 45 are inclined so that movement of the actuator rod 47 and wedge jaws 44 in an upward direction closes the jaws 44.

Movement of each actuator rod 47 in the housing 46 is controlled by a cam ring 48 mounted on the frame 33 beneath the periphery of the conveyor table 37. The cam ring 48 has an upper surface 49 upon which the lower end of each actuator rod 47 is frictionally slidable as the conveyor 25 rotates through a 360° arc. A low portion 50 of the upper surface 49 of the cam ring 48 is provided adjacent to the unloading and loading stations 23 and 19 to allow the actuator rod 47 to move downwardly. Downward movement of the actuator rod 47 moves the wedge jaws 44 downwardly in the inclined bores 45, thus opening the jaws 44 while the chucks 43 are at the unloading and loading stations 23 and 19. The remaining high portion 51 of the upper surface 49 of the cam ring 48 is positioned to raise the actuator rods 47 to close the jaws 44.

At the loading station 19, the vibratory feeder 26 feeds the anodes 10 with projecting leads 11 longitudinally into the upper end of the vertical tube 52. A first stop bar 53 connected to a pivoted lever 54 is normally urged into the tube 52 by a spring connected to the lever 54 for holding the anodes within the tube 52. Actuation of an escapement solenoid 56 pivots the lever 54 for moving the first stop bar 53 from the tube 52 and moving a second stop bar 57 connected to the lever 54 into the tube 52. Moving the first stop bar 53 from the tube 52 allows a single anode 10 to be fed into a chuck 43 indexed into alignment with the tube 52. The second stop bar 57 prevents the feeding of more than one anode 10 from the tube 52.

Now upon subsequent advancement of the conveyor table 37, the actuator rod 47 is raised by the cam ring 48 to close the jaws 44 to grip the anode 10.

*Chisel point forming*

Considering now the chisel point forming mechanism at the chisel point forming station 20, as shown in FIGS. 4 and 6, the mechanism is supported by an extension 58 of the frame 33 which projects horizontally over the edge of the conveyor table 37. A pair of arms 59 and 60 are pivotally mounted at first ends on a pivot pin 61 which is secured to the underside of the extension 58. Secured to opposite or free ends of the arms are the two coacting V-edged dies 12 and 13. Two pins 62 and 63 extend upwardly from the arms 59 and 60 through slots 64 and 65 in the extension 58 and into two arcuate camming slots 67 and 68 formed in a rotor 69. The periphery of the rotor 69 is engaged and rotatably supported by spaced arcuate guide flanges 70 mounted on the extension 58.

An air cylinder 72 is mounted on the upper side of the extension 58 and has a piston rod 73 which is pivotally connected to the rotor 69. Upon actuation of the air cylinder 72, the rotor 69 is rotated whereby the pins 62 and 63 are cammed by the arcuate slots 67 and 68 to close the V-edged dies 12 and 13.

Prior to the actuation of the air cylinder 72, an anode 19 is advanced by the conveyor 25 to the chisel point forming station 20 so that the anode lead 11 extends upwardly between the two V-edged dies 12 and 13. Upon actuation of the air cylinder 72, the lead 11 is severed by the dies 12 and 13 to form a chisel point 14 on the portion of the lead 11 remaining attached to the anode 10.

*Disk punching and assembling*

Considering next the details of the disk punch mechanism at the disk punching and assembling station 21, as best shown in FIGS. 5 and 7, a vertical block 76 is mounted on the frame 33. A horizontal female die plate 77 projects from the block 76 and extends over the edge of the conveyor table 37. There is formed in the block 76 a vertically extending dove-tail groove 80 for receiving a dovetail guide 79 projecting from a ram 78.

The ram 78 is moved by a lever 82 pivotally mounted at its midpoint on a pin 83 supported by brackets 84 extending upwardly from the frame 33. More particularly, the lever 82 is pivotally connected at one end to the movable ram 78 and at its other end to a piston rod 86 slidably mounted in an air cylinder 87 secured to the frame 33. Actuation of the air cylinder 87 and the piston rod 86 pivots the lever 82 about the bracket pin 83 to slide the ram 78 vertically in the dove-tail groove 80.

The female die plate 77 has a circular opening 88 extending vertically therethrough which defines a circular cutting edge 89 in the upper surface of the die plate 77. A recessed pathway 92 in the upper surface of the die plate 77 and a slotted plate 93 guide the insulating tape 30 over the circular cutting edge 89. The tape 30 is advanced from a supply reel 96 (see FIG. 4) across the circular cutting edge 89 and to a tape take-up reel 98 by a motor 97 which incrementally rotates the reel 98.

Extending downwardly from the ram 78 is the cylindrical punch 29 which is aligned with the die opening 88 formed in the plate 77. The cylindrical punch 29 mates with the circular cutting edge 89 in the die plate 77 for severing a disk 17 from the tape 30.

The central passageway 31 of the punch 29 has a diameter which is just slightly larger than the diameter of the anode lead 11. This diameter of the passageway 31 is large enough to allow insertion of the anode lead 11 and small enough to preclude passage of any substantial amount of air through the passageway 31 when the anode lead 11 is inserted therein.

The punch passageway 31 communicates with an entry passageway 99 bored in the ram 78. A flexible hose 100 from the vacuum source (not shown) is connected to the passageway 99 for applying a vacuum from the vacuum source through the ram passageway 99 to the punch passageway 31. This vacuum is effective to hold a severed disk 17 on the end of the punch 29 over the passageway opening 102.

Also at the disk punching and assembling station 21, a motor 103 is mounted on the frame 33. A friction wheel 104 is mounted on a rotating shaft 105 of the motor 103 and extends inwardly past the periphery of the conveyor table 37. When the conveyor table 37 advances a rotatably mounted chuck 43 holding an anode 19 to the disk punching and assembling station 21, the outer surface of the sleeve 46 of the chuck 43 contacts the rotating wheel 104; thus, the chuck 43 and anode 10 are rotated about their longitudinal axes.

Now when the ram 78 slides downwardly, the punch 29 is advanced to sever a disk 17 from the tape 30. The severed disk 17 is held by the vacuum on the end of the punch 29 over the passageway opening 102. Continued downward movement of the ram 78 forces the severed disk 17 against the rotating chisel point 14 of the anode lead 11. This rotating lead 11 acts as a drill to bore a hole through the advancing disk 17. The lead 11 is received into the passageway 31 and interrupts the vacuum to release the severed disk 17 and thus assemble the disk 17 onto the lead 11.

It is noted that the passageway 31 of the punch 29 terminates in a beveled opening 102 that serves to guide the lead 11 into the passageway 31. Also, the beveled opening 102 prevents the ruptured edges of the disk 17 surrounding the newly drilled hole from wedging between the lead 11 and the wall of the passageway 31 and restricting the withdrawal of the lead 11 from the passageway 31.

When the punch 29 reaches its downward position, a projection 106 on the ram 78 strikes an arm operating a switch 108 mounted on the vertical block 76. Operation of the switch 108 is effective to stop the downward movement of the punch 29 to prevent any possible damage to the anode 10.

*Control circuit and operation*

Figure 8:
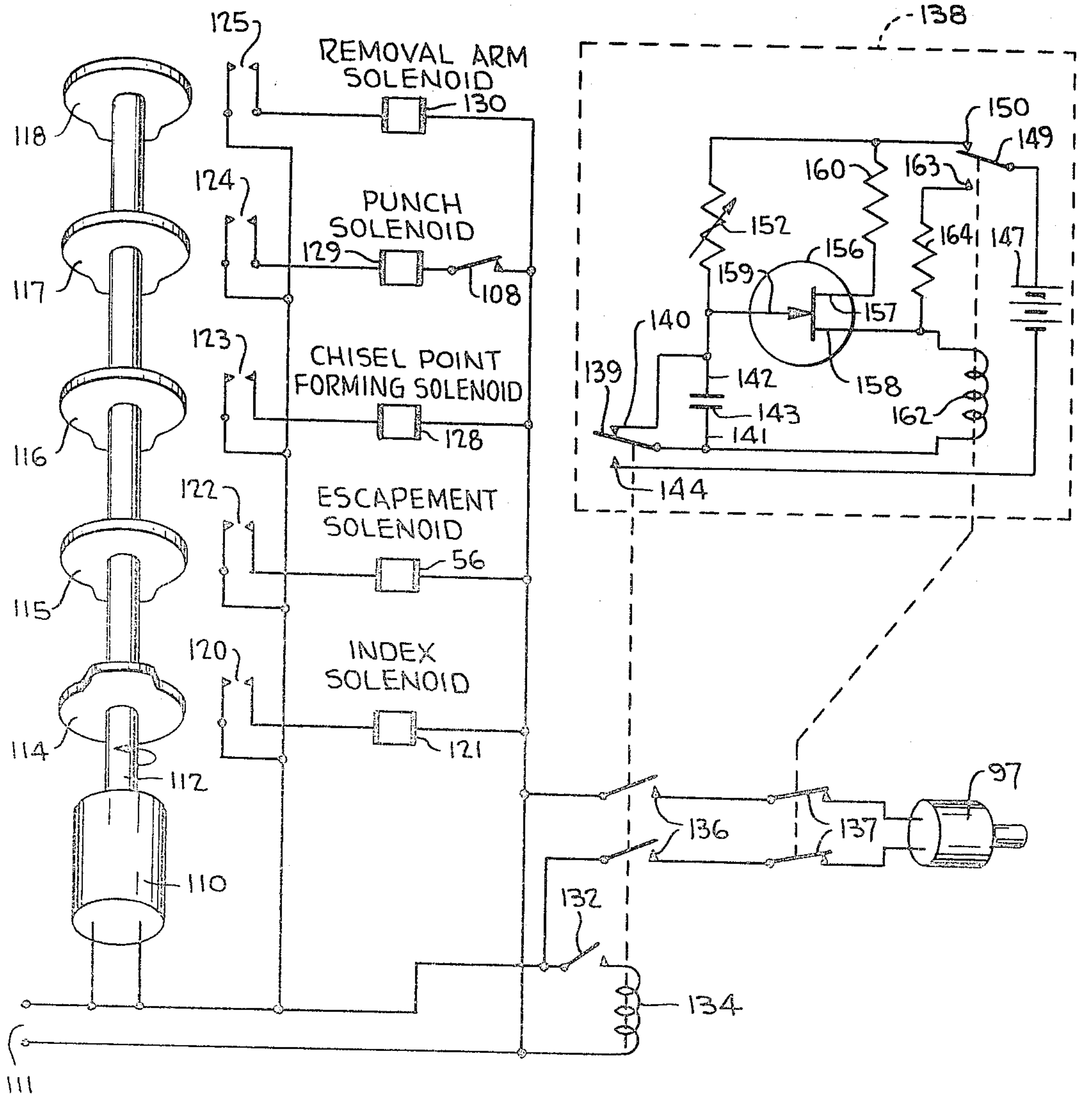
FIG. 8 is a schematic illustrating a control circuit for operating the machine.

Operation of the overall machine may be understood by referring to FIG. 8, wherein there is shown a circuit for controlling the sequential operation of the various component mechanisms included at the various work stations 19 to 23. This circuit includes an electrical power source 111 for operating a motor 110 that rotates a shaft 112 on which are fixed control cams 114, 115, 116, 117, and 118.

In particular, a first pair of contacts 120 operated by the first cam 114 completes a circuit through an index solenoid 121. The index solenoid 121 is effective to operate a valve (not shown) which applies air to the indexing air cylinder 41, whereupon the piston rod 40 and the spring-biased pawl 39 rotate the ratchet wheel 38 and the conveyor table 37 through a predetermined angle. This rotation through a predetermined angle advances successive chucks 43 to the respective work stations 19–23.

After the advance of the chucks to the work stations, a second cam 115, a third cam 116, a fourth cam 117, and a fifth cam 118 are effective to simultaneously close second contacts 122, third contacts 123, fourth contacts 124, and fifth contacts 125, respectively. These closing contacts initiate the simultaneous operation of the escapement mechanism, chisel point forming mechanism, disk punch mechanism, and unloading mechanism, respectively.

More particularly, the closing second contacts 122 complete a circuit through the escapement solenoid 56 to pivot the escapement lever 54 and feed a single anode from the tube 52 into the chuck 43 previously indexed to the loading station 19.

The closing third contacts 123 complete a circuit through a chisel point forming solenoid 128 to operate a valve (not shown) to actuate the chisel point forming air cylinder 72 and piston rod 73. The actuated piston rod 73 than rotates the rotor 69 to close the V-edged dies 12 and 13 and thus form a chisel point 14 on an anode lead 11.

Closure of the contacts 124 completes a circuit through a punch solenoid 129 and the normally closed punch stop switch 108. The solenoid 129 is effective to actuate a punch valve (not shown) which operates the punch air cylinder 87 and piston rod 86 to move the punch 29 downwardly. As the punch 29 moves downwardly, it shears a disk 17 from the tape 30 and transfers the severed disk 17 onto a rotating anode lead 11. The vacuum applied to the punch passageway 31 for holding the severed disk 17 on the end of the punch 29 is interrupted by the lead 11 as it penetrates through the advancing disk 17 and is received into the passageway 31.

The fifth contacts 125 operated by the fifth cam 118 complete a circuit through a removal arm solenoid 130. A removal arm valve (not shown) is actuated by the solenoid 130 upon completion of the circuit. Upon this actuation, the removal arm mechanism 32 is operated to transfer an anode 10 within the unloading station 23 from the conveyor 25 to the receptacle (not shown).

Referring now to the circuitry for incrementally energizing the tape advance motor 97 within the disk assembly station 21, a switch 132 mounted on the vertical block 76, FIG. 7, is actuated by a projection 133 of the ram 78 in its upward position. The actuation of this switch 132 completes a circuit through a relay 134. Energization of the relay 134 closes normally open contacts 136 to complete a circuit through normally closed contacts 137 and the tape advance motor 97. Upon completion of this circuit, the motor 97 is energized to rotate the tape take-up reel 98 to advance the tape 30 from the supply reel 96 across the die plate 77.

Also, the relay 134 initiates operation of a timing circuit 138 by operating a first double throw contactor 139 to disconnect a first normally closed contact 140 and open a circuit normally shorting a pair of terminals 141 and 142 of a timing capacitor 143. The first double throw contactor 139 connects a first normally open contact 144 to complete a circuit connecting a negative side of a battery 147 to the first terminal 141 of the capacitor 143. The positive side of the battery 147 is connected through a second double throw contactor 149, a second normally closed contact 150, and a variable potentiometer 152 to the second terminal 142 of the capacitor 143. The connected battery 147 is effective to charge the capacitor 143 at a rate determined by the resistance of the potentiometer 152. The resistance of the potentiometer 152 is controlled by an arm 153, FIG. 4, that senses the diameter of tape 30 on the take-up reel 98. Thus, the charging rate of the capacitor 143 is dependent upon the diameter of the tape 30 on the reel 98.

The timing circuit 138 also contains a unijunction transistor 156 having a first base electrode 157, a second base electrode 158, and an emitter electrode 159. The first base electrode 157 is connected by a resistor 160 through the seocnd normally closed contact 150 and the second double throw contactor 149 to the positive side of the battery 147. The second base electrode 158 is connected through a relay winding 162 to the second terminal 141 of the capacitor 143. The emitter electrode 159 is connected to the first terminal 142 of the capacitor 143.

When the voltage on the capacitor 143 rises to a predetermined magnitude, the unijunction transistor 156 is triggered to complete a circuit through the emitter 159, the second base 158, the relay 162, and the capacitor 143. The energy stored in the capacitor 143 is impressed through the now conducting transistor 156 to energize the relay 162.

Energization of the relay 162 operates the second double throw contactor 149 to open the second normally closed contact 150 and disconnect the potentiometer 152 and the first terminal 142 of the capacitor 143 from the positive side of the battery 147. Operation of the second double throw contactor 149 also connects a second normally open contact 163 to complete a circuit through a resistor 164, the relay 162, the first double throw contactor 139, the first normally open contact 144, and the battery 147. This circuit is effective to hold the relay 162 energized until the opening of the first double throw contactor 139 and first normally open contact 144. The contactor 139 will open when the relay 134 operated by the projection 133 on the movable member 78 is de-energized.

Energization of the relay 162 by the triggering of the unijunction transistor 156 also opens the normally closed contacts 137 in series with the tape advance motor 97. Thus, the rotation of the motor 97 and reel 98 is stopped by the opening of the contacts 137 after a period of time determined by the diameter of the tape 30 on the reel 98. The dependence of the incremental rotation of the reel 98 upon the diameter of the tape 30 on the reel 98 insures that the incremental advance of the tape 30 across the die plate 77 remains constant even though the diameter of the tape 30 on the reel 98 increases as more tape 30 is taken up.

It is to be understood that the above-described arrangements of apparatus and construction of elemental parts are simply illustrative of an application of the principles of the invention and many other modifications may be made without departing from the scope of the invention.

What is claimed is:

1. An apparatus for assembling an article onto a post comprising:

a vacuum source;

a member having a passageway communicating with said vacuum source for holding said article thereon;

said passageway having a portion with a cross section large enough to allow insertion of said post therein and small enough to restrict air flow through said passageway when said post is inserted therein; and means for moving said member relative to said post to pass said post through said article and into said passageway to interrupt said vacuum to release and assemble said article onto said post.

2. An apparatus for assembling a penetrable article onto a post comprising:

a movably mounted member having a passageway terminating in a beveled opening;

means for applying a vacuum to said passageway to hold said article over said beveled opening;

said passageway having a portion with a cross section large enough to allow insertion of said post therein and small enough to restrict air flowing through said passageway when said post is inserted therein; and means for moving said member relative to said post to impale said post through said article and guide said post into said beveled opening and into said passageway to interrupt said vacuum to release and assemble said article onto said post.

3. An apparatus for assembling a disk onto a wire lead having a chisel point comprising:

a member having an aperture large enough to allow insertion of said wire therein and small enough to interrupt air flow through said aperture when said wire is inserted therein;

means for applying a vacuum to said aperture to hold said disk on said member over said aperture;

means for rotating said wire lead about its longitudinal axis with respect to said disk; and means for moving said member relative to said wire lead to force said rotating chisel point through said disk and to insert said wire lead into said aperture to interrupt said vacuum to assemble said disk onto said wire lead.

4. An apparatus for severing an article from a severable strip and assembling the article onto a post comprising:

a first die member having an aperture large enough to allow insertion of said post therein and small enough to interrupt air flow through said aperture when said post is inserted therein;

means for impressing a vacuum through said aperture to hold said article to said first die;

a second die member for mating with said first die; and means for moving said first die relative to said second die to sever said article from said strip and transfer said article onto said post whereupon the post impales through said article and is inserted into said aperture to interrupt said vacuum.

5. An apparatus for severing a disk from a strip and assembling the disk onto a wire lead having a chisel point comprising:

a male die member having a central passageway large enough to allow insertion of said wire therein and small enough to interrupt air flow through said aperture when said wire is inserted therein;

a female die member for mating with said male die to sever a disk from said strip;

means for applying a vacuum to said passageway to hold said disk on said male die over said passageway;

means for rotating said wire lead about its longitudinal axis; and means for advancing said male die relative to said female die and said wire lead to sever a disk from said strip and to transfer said disk onto said rotating wire, whereupon said chisel point cuts through said disk and said wire enters said passageway to interrupt said vacuum.

6. In an apparatus for assembling an insulating disk onto a wire lead extending from an electrical component:

(1) a movable carrier means for receiving and supporting rotatably said component;

(2) a first work station comprising;

(a) means for forming a chisel point on said wire, (3) a second work station comprising;

(a) means for rotating said component about its longitudinal axis, (b) a transfer member having an aperture large enough to allow insertion of said wire therein, and (c) means for holding said disk on said member over said aperture, (4) means for moving said carrier successively to said first work station and to said second work station;

(5) means actuated upon the advance of said carrier to said first work station for operating said forming means; and (6) means actuated upon the advance of said carrier to said second work station for operation said rotating means and for moving said transfer member and said disk relative to said rotating component to force said chisel point through said disk into said aperture to assemble said disk onto said wire.

7. In an apparatus for severing a disk from a strip and assembling the insulating disk onto a wire lead extending from an electrical component:

(1) a movable carrier means for receiving and supporting rotatably said component;

(2) a first work station comprising;

(a) means for forming a chisel point on said wire, (3) a second work station comprising;

(a) a male die member having a central passageway large enough to allow insertion of said wire therein and small enough to interrupt air flow through said passageway when said wire is inserted therein, (b) a female die member for mating with said male die to sever said disk from said strip, (c) means for applying a vacuum to said passageway to hold said disk on said male die over said passageway, (d) means to rotate said component and wire about its longitudinal axis, (4) means for moving said carrier successively into said first work station and into said second work station;

(5) means actuated upon the advance of said carrier to said first work station for operating said forming means; and (6) means actuated upon the advance of said carrier to said second work station for operating said rotating means and for moving said male die relative to said female die and said component to sever said disk from said strip and to transfer said disk onto said rotating wire whereupon the chisel point passes through said disk and into said passageway to interrupt said vacuum.

References Cited

UNITED STATES PATENTS

| | | | |
|---|---|---|---|
| 907,690 | 12/1908 | Harbeck | 93—100 |
| 1,426,759 | 8/1922 | Nickol | 29—33 |
| 1,451,610 | 4/1923 | Gestas | 29—203 X |
| 1,541,870 | 6/1925 | Standish | 29—423.2 |
| 2,332,445 | 10/1943 | Grim | 29—208 |
| 2,403,443 | 7/1946 | Knab | 29—203 X |
| 2,915,201 | 12/1959 | Calehuff et al. | 214—1 |
| 3,046,635 | 7/1962 | Terez | 29—25.19 |
| 3,152,720 | 10/1964 | Maloney et al. | 221—1 |
| 3,198,311 | 8/1965 | Lajoie | 198—33 |
| 3,226,810 | 1/1966 | Beliveau | 29—203 |

JOHN F. CAMPBELL, *Primary Examiner.*

THOMAS H. EAGER, *Examiner.*